（12） United States Patent
Usami

(10) Patent No.: US 9,132,717 B2
(45) Date of Patent: Sep. 15, 2015

(54) INTERIOR COMPONENT FOR VEHICLE

(71) Applicant: TOYOTA BOSHOKU KABUSHIKI KAISHA, Aichi-ken (JP)

(72) Inventor: Katsuhiko Usami, Aichi (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/065,901

(22) Filed: Oct. 29, 2013

(65) Prior Publication Data

US 2014/0132025 A1  May 15, 2014

(30) Foreign Application Priority Data

Nov. 12, 2012  (JP) ................ 2012-248508

(51) Int. Cl.
*B60J 1/20* (2006.01)
(52) U.S. Cl.
CPC ..................... *B60J 1/2063* (2013.01)
(58) Field of Classification Search
CPC ................. B60J 1/20; B60J 1/2063
USPC ....................... 296/97.8, 143, 97.6
See application file for complete search history.

(56) References Cited

U.S. PATENT DOCUMENTS

| | | | |
|---|---|---|---|
| 7,401,840 B2 * | 7/2008 | Schnoblen et al. | 296/143 |
| 7,556,852 B2 * | 7/2009 | Aoki et al. | 428/172 |
| 2005/0051284 A1 | 3/2005 | Fischer | |

FOREIGN PATENT DOCUMENTS

| | | |
|---|---|---|
| DE | 10137807 | 2/2003 |
| JP | 2006-199234 | 8/2006 |

OTHER PUBLICATIONS

German Office Action in counterpart Application No. 10 2013 222 824.4, dated Apr. 16, 2015 (with partial English-language translation).

* cited by examiner

*Primary Examiner* — Joseph D Pape
*Assistant Examiner* — Dana Ivey
(74) *Attorney, Agent, or Firm* — Greenblum & Bernstein, P.L.C.

(57) ABSTRACT

A vehicle interior component to which a shade assembly, which includes a shade and a shaft, is mounted includes an interior component body including a top wall, and a protruding member. The top wall is arranged such that a longitudinal direction thereof corresponds to an axial direction of the shaft. The top wall has an opening through which the shade is drawn. The top wall has exterior and interior opening edges at the opening. The interior opening edge includes a straight section and a raised section having a different shape from the straight section. The protruding member is arranged below the raised section and having a protruded edge extending straight in the longitudinal direction and on which the shade leans from an exterior side of the vehicle such that the shade bends toward an interior of the vehicle at the protruded edge when the shade is unrolled.

13 Claims, 7 Drawing Sheets

INTERIOR COMPONENT FOR VEHICLE

CROSS REFERENCE TO RELATED APPLICATION

This application claims priority from Japanese Patent Application No. 2012-248508 filed on Nov. 12, 2012. The entire contents of the priority application are incorporated herein by reference.

TECHNICAL FIELD

The present disclosure relates to an interior component for a vehicle.

BACKGROUND

A known vehicle interior component includes a shade assembly that is attached to another part of the vehicle interior component. For example, the shade assembly is arranged inside an upper end portion of an interior component attached to a door. A shade of the shade assembly is drawn through the upper end portion of the vehicle interior component to cover a window.

The shade is generally drawn upward from the upper end portion of the vehicle interior component through an opening of the upper end portion. If a surface of an object covered by the shade tilts inwardly such that an upper end of the surface is located more interior than a lower end thereof, e.g., a closed side window, the shade may slope toward an interior of the vehicle.

The shade that slopes inwardly toward the interior of the vehicle is in contact with an opening edge of the vehicle interior component (specifically, the opening edge that is on an interior side of the vehicle) when the shade is drawn upward. Thus, the shade may be bent along the opening edge.

If the opening edge, with which the shade is in contact, is linear over its length, the shade is bent linearly over the entire length thereof. However, some vehicle interior components have an opening edge that is not linear over its length. If the opening edge has a non-linear section, the shade is bent along the non-linear section, and thus the shade is likely to have wrinkles or folds. For example, if the opening edge has a convex section, a part of the shade is curved along the convex section, which is the non-linear section, and the part of the shade is likely to have wrinkles or folds at the convex section.

SUMMARY

The present invention has been made in view of the aforementioned circumstances. An objective of the present invention is to provide a vehicle interior component in which the shade is less likely to have wrinkles or holds even if the vehicle interior component has an opening with a non-linear opening edge.

A technology disclosed herein relates to a vehicle interior component to which a shade assembly is mounted. The shade assembly includes a flexible shade and a shaft configured to roll up the shade. The interior component includes an interior component body including a top wall and a protruding member. The interior component body inducing the top wall positioned above the shaft, having an elongated shape, arranged such that a longitudinal direction thereof corresponds to an axial direction of the shaft, having an opening through which the shade is drawn upward above the top wall, and having an exterior opening edge and an interior opening edge at the opening. The opening extends through the top wall in a thickness direction thereof and along a longitudinal direction thereof. The interior opening edge includes a straight section extending straight in the longitudinal direction of the top wall and a raised section having a different shape from the straight section. The protruding member is arranged below the raised section and has a protruded edge extending straight in the longitudinal direction of the top wall and on which the shade leans from an exterior side of the vehicle such that the shade bends toward an interior of the vehicle at the protruded edge when the shade is unrolled from the shaft.

DETAILED DESCRIPTION

Figure 1:
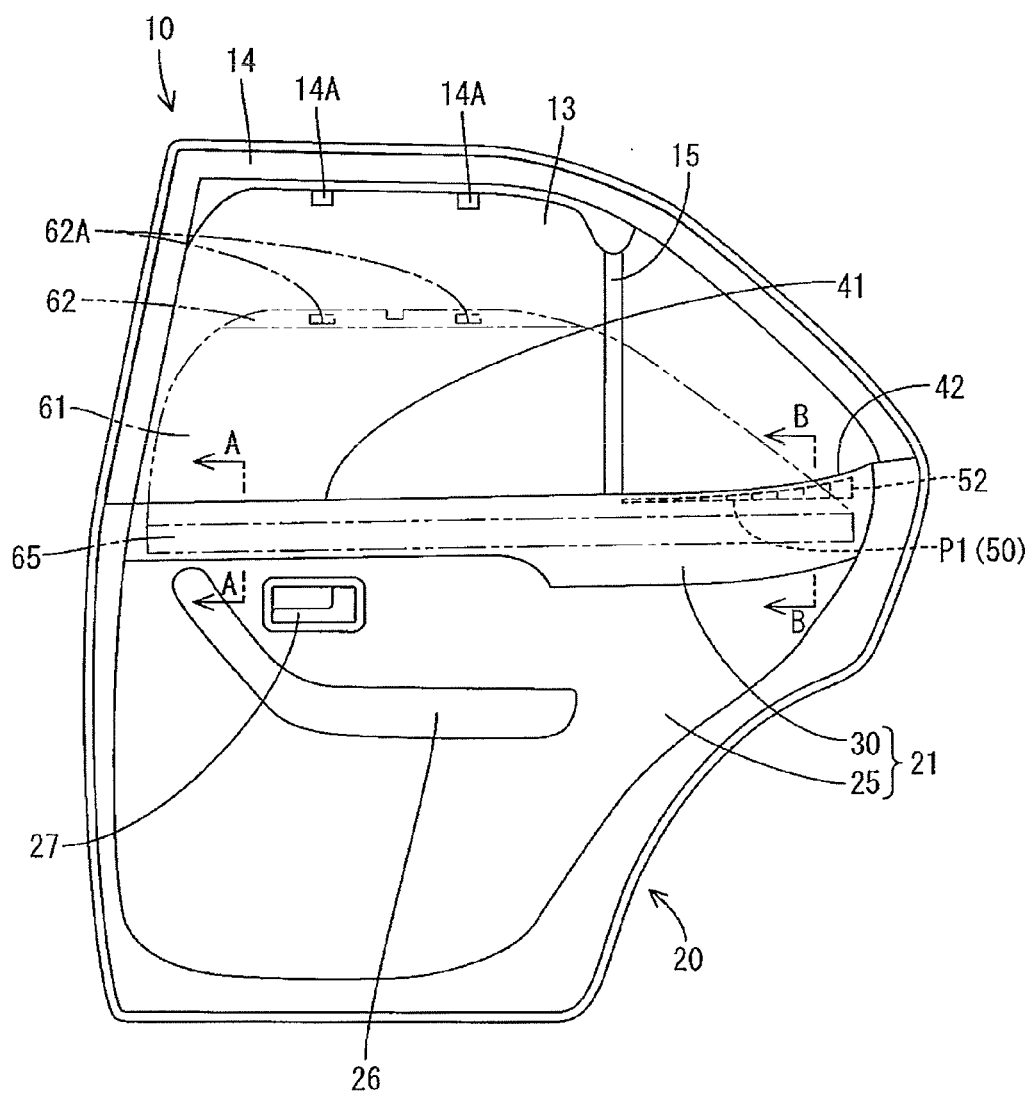
FIG. 1 is a view of an interior side of a vehicle door with a door trim according to an embodiment.

An embodiment will be described with reference to FIGS. 1 to 7. As illustrated in FIG. 1, a vehicle door 10 includes a door trim 20 (a vehicle interior component). In the following description, a front side of a vehicle corresponds to a left side in FIGS. 1 and 7 and a rear side of a vehicle corresponds to a right side in FIGS. 1 and 7. An interior side of the vehicle corresponds to a left side in FIGS. 5 and 6 and an exterior side of the vehicle corresponds to a right side in FIGS. 5 and 6.

The vehicle door 10 is a vehicle side door. The vehicle door 10 includes the door trim 20 and a vehicle door panel that includes an inner panel 11 (see FIG. 5) and an outer panel (not illustrated). The door trim 20 is mounted on an interior side of the vehicle door panel.

The vehicle door 10 includes a window glass 13 (a side window) and a window frame 14 that holds the window glass 13. The vehicle door 10 further includes a division bar 15 that divides an area surrounded by the window frame 14 into two sections in a front-to-rear direction of the vehicle (a right-to-left direction in FIG. 1).

The window glass 13 is movable up and down by a window regulator (not illustrated). The window glass 13 enters a storage space between the inner panel 11 and the outer panel when the window glass 13 moves down.

Figure 5:
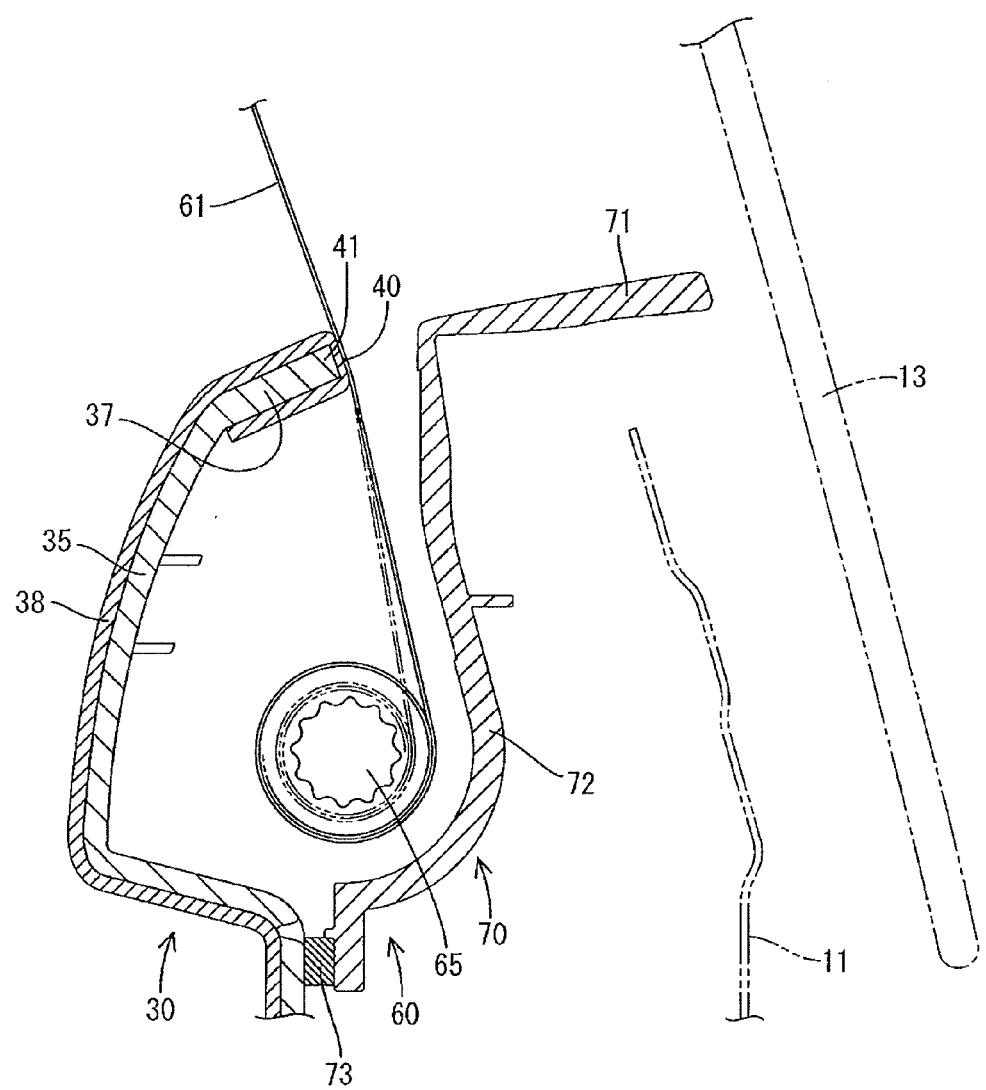
FIG. 5 is a cross-sectional view of a part of the vehicle including a shade assembly and the door trim along a line A-A in FIG. 1.

A weather-strip (not illustrated) is arranged between the window glass 13 and the inner panel 11 to seal a gap between the window glass 13 and the inner panel 11. As illustrated in FIG. 5, the window glass 13 tilts toward the interior of the vehicle (the left side in FIG. 5) such that an upper edge of the window glass 13 is located more interior than a lower edge thereof.

As illustrated in FIG. 1, the door trim 20 includes a trim board 21 as a main component. The trim board 21 is made of a synthetic resin material such as polypropylene, for example.

A material of the trim board 21 is not limited to the synthetic resin material, and may be a mixture of a wooden material and a synthetic resin.

As illustrated in FIG. 1, the trim board 21 includes a lower board 25 and an upper board 30. The lower board 25 and the upper board 30 provide a lower part and an upper part of the trim board 21, respectively. As illustrated in FIG. 1, an armrest 26 and an inside door handle 27 are arranged on the lower board 25.

Figure 2:
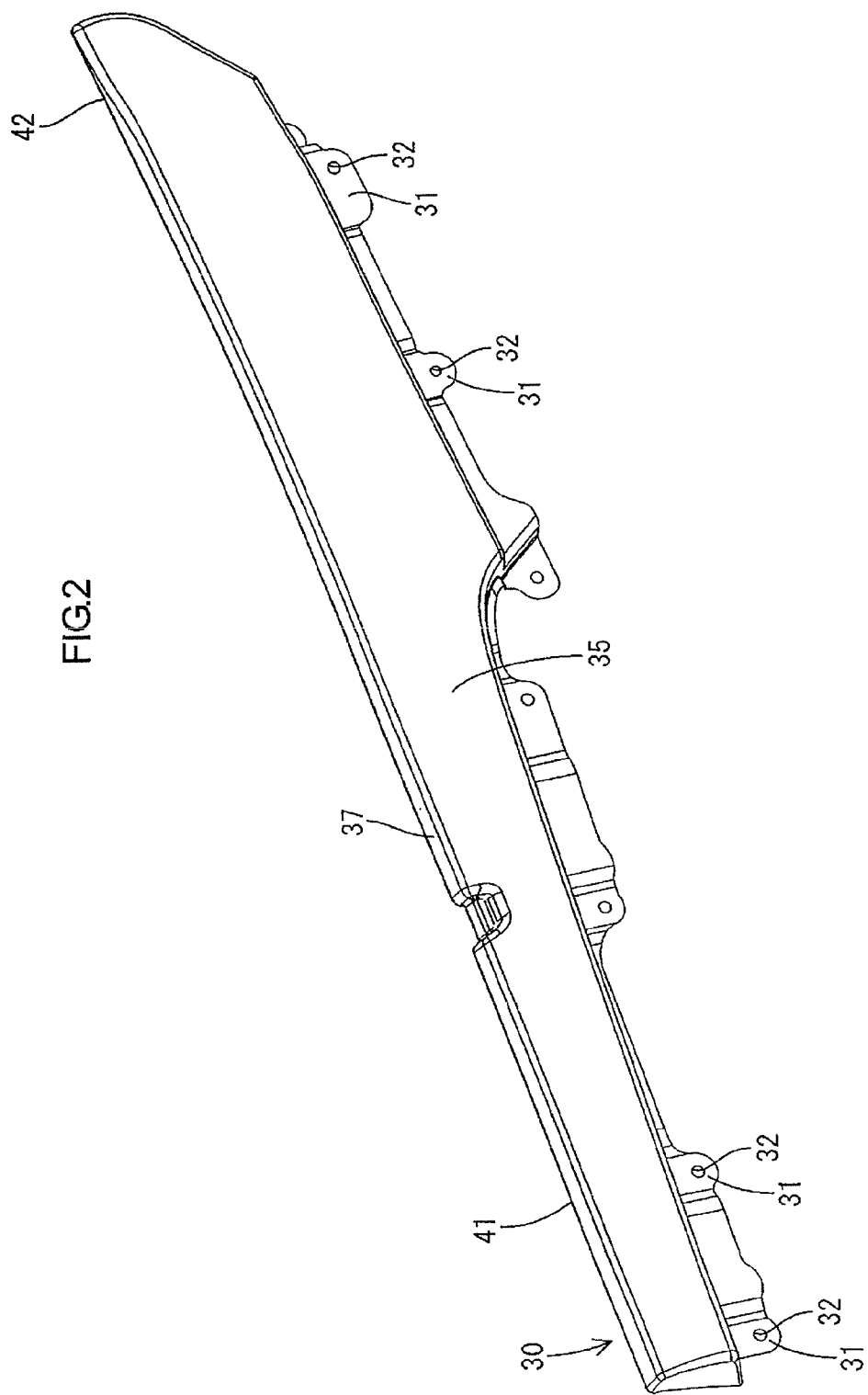
FIG. 2 is a perspective view of an interior side of an upper board included in the door trim illustrated in FIG. 1.

As illustrated in FIG. 1 and FIG. 2, the upper board 30 has an elongated shape that extends in the front-to-rear direction of the vehicle. As illustrated in FIG. 2, the upper board 30 includes attachment pieces 31 at its lower section. The attachment pieces 31 each include amounting hole 32. The lower board 25 includes mounting bosses (not illustrated) on its back surface. The mounting bosses are passed through the respective mounting holes 32 from the interior side of the vehicle.

An end portion of the mounting boss that is passed through the mounting hole 32 is fastened to an edge of the mounting hole 32 by a fastening method such as fastening by a screw or thermal caulking. As a result, the upper board 30 is connected to the lower board 25.

As illustrated in FIG. 5, the upper board 30 includes a main wall 35 and a top wall 37. The main wall 35 extends in a substantially vertical direction. The top wall 37 extends outwardly from an upper end of the main wall 35 toward an exterior of the vehicle. The main wall 35 and the top wall 37 each have an elongated shape extending in the front-to-rear direction of the vehicle. The top wall 37 of the upper board 30 provides a surface that faces a vehicle ceiling.

As illustrated in FIG. 5, a shade assembly 60 is arranged behind the upper board 30 in a vehicle width direction, which corresponds to a right-to-left direction in FIG. 5. The shade assembly 60 includes a shade 61, a shaft 65 for rolling up the shade 61, and a cover 70 that covers the shaft 65 at least.

The shade 61 is a flexible sheet-like member having a rectangular shape. Examples of the flexible sheet-like member include a semitransparent sheet, an opaque sheet, a mesh sheet, a woven fabric, and a non-woven fabric. Examples of the material of the flexible sheet-like member include a synthetic resin such as polyvinyl chloride and polypropylene.

The shade 61 has a size that can cover substantially entire surface of the window glass 13 from the interior side of the vehicle when the shade 61 is unrolled from the shaft 65. The shade 61 covering the window glass 13 can block the light coming into the interior of the vehicle through the window glass 13. In addition, the shade 61 provides visual isolation between the inside and the outside of the vehicle.

The shaft 65 has a cylindrical shape around which the shade 61 can be rolled. The shaft 65 is made of a synthetic resin such as polypropylene or a metal such as aluminum and iron. The shaft 65 includes a coil spring therein (not illustrated). Due to the elastic force of the coil spring, the shaft 65 is always biased in a rotation direction that can roll up the shade 61.

As illustrated in FIG. 1, a frame 62 having an elongated plate shape is provided at an upper end of the shade 61. The shade 61 is drawn out of the storage space from the end at which the frame 62 is provided. The frame 62 is made of a synthetic resin such as polypropylene or a metal such as aluminum and iron. In FIG. 1, the shade 61 and the frame 62 that are half unrolled are indicated by a two-dotted chain line.

The frame 62 includes hook through-holes 62A (two hook through-holes 62A in this embodiment). The hook through-holes 62A are provided along the front-to-rear direction of the vehicle. The window frame 14 includes hooks 14A at a position close to the upper end of the window glass 13. The frame 62 is hooked to the window frame 14 with the hooks 14A passed through the corresponding hook through-holes 62A, and thus the shade 61 that is unrolled can maintain its unrolled state.

The cover 70 has an elongated shape extending in an axial direction of the shaft 65 (the front-to-rear direction of the vehicle). As illustrated in FIG. 5, the cover 70 includes a cover body 72 and a flange 71. The cover body 72 covers the shaft 65 from an exterior side and a lower side of the vehicle. The cover 70 is attached to the upper board 30 by a screw at amounting boss (not illustrated) that is provided on the rear surface of the upper board 30.

The shaft 65 is positioned below the top wall 37 of the upper board 30 and the axial direction thereof corresponds to the longitudinal direction of the top wall 37 (the front-to-rear direction of the vehicle). The shaft 65 is placed in the storage space defined by the upper board 30 and the cover 70. In other words, the upper board 30 and the cover 70 constitute a housing that stores the shaft 65 therein.

A sealing member 73 is arranged to seal a gap between a lower end of the cover body 72 and the upper board 30. The sealing member 73 extends over the entire length of the upper board 30 or the cover 70 in the front-to-rear direction of the vehicle.

The flange 71 of the cover 70 extends from an upper end of the cover body 72 toward the exterior of the vehicle. An upper surface of the flange 71 is substantially flush with an upper surface of the top wall 37. The top wall 37 and the flange 71 are spaced apart from each other in a vehicle width direction to form an opening 40 (an opening for the shade). The shade 61 rolled on the shaft 65 is drawn up through the opening 40. The top wall 37 and the flange 71 constitute the top wall of the vehicle interior component according to the present technology. The top wall 37 is an example of the first top wall. The flange 71 is an example of the second top wall.

In this embodiment, the trim board 21 and the flange 71 constitute a main body (interior component body, base member) of the door trim 20. The top wall 37 and the flange 71 constitute the top wall of the door trim 20 that has the upper surface that faces the ceiling of the vehicle. The opening 40 is provided in the upper wall that has the upper surface facing the ceiling of the vehicle.

Figure 7:
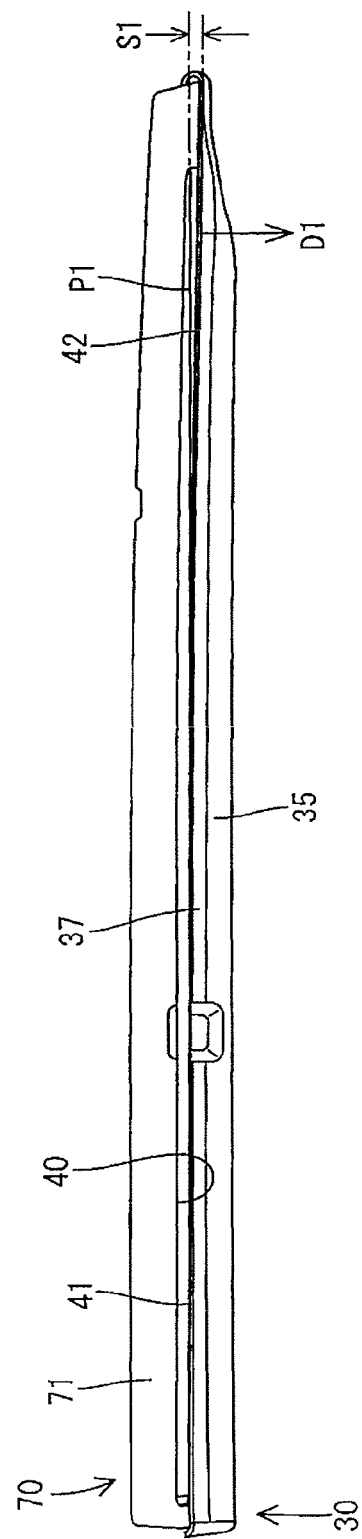
FIG. 7 is a top view of the upper board and a cover.

The opening 40 extends through the top wall 37 in the vertical direction (a thickness direction of the top wall 37 or the flange 72). As illustrated in FIG. 7, the opening 40 has an elongated shape extending along the longitudinal direction of the top wall 37 and the flange 71. The opening 40 is slightly longer than the shade 61 in the front-to-rear direction of the vehicle.

In this embodiment, as illustrated in FIG. 1, an upper end of the upper board 30 (the top wall 37) extends in the front-to-rear direction of the vehicle. The upper end extends straight in a front region that is located in front of the division bar 15 and extends upwardly toward the rear side of the vehicle in a rear region that is located behind the division bar 15.

In this embodiment, the top wall including the top wall 37 and the flange 71 has an interior opening edge and an exterior opening edge located on an interior side and an exterior side of the vehicle, respectively, at the opening 40. An upper end of the top wall 37 that is positioned away from the end of the main wall 35 constitutes the interior opening edge. The interior opening edge has a shape corresponding to the shape of the upper end of the top wall 37. As illustrated in FIG. 1, the interior opening edge has a straight section 41 and a raised section 42. The straight section 41 extends straight and the raised section 42 extends gradually upwardly from the straight section 41 toward the rear side of the vehicle.

The straight section 41 is positioned in front of the division bar 15 in the front-to-rear direction of the vehicle and the raised section 42 is positioned behind the division bar 15 in the front-to-rear direction of the vehicle.

Figure 4:
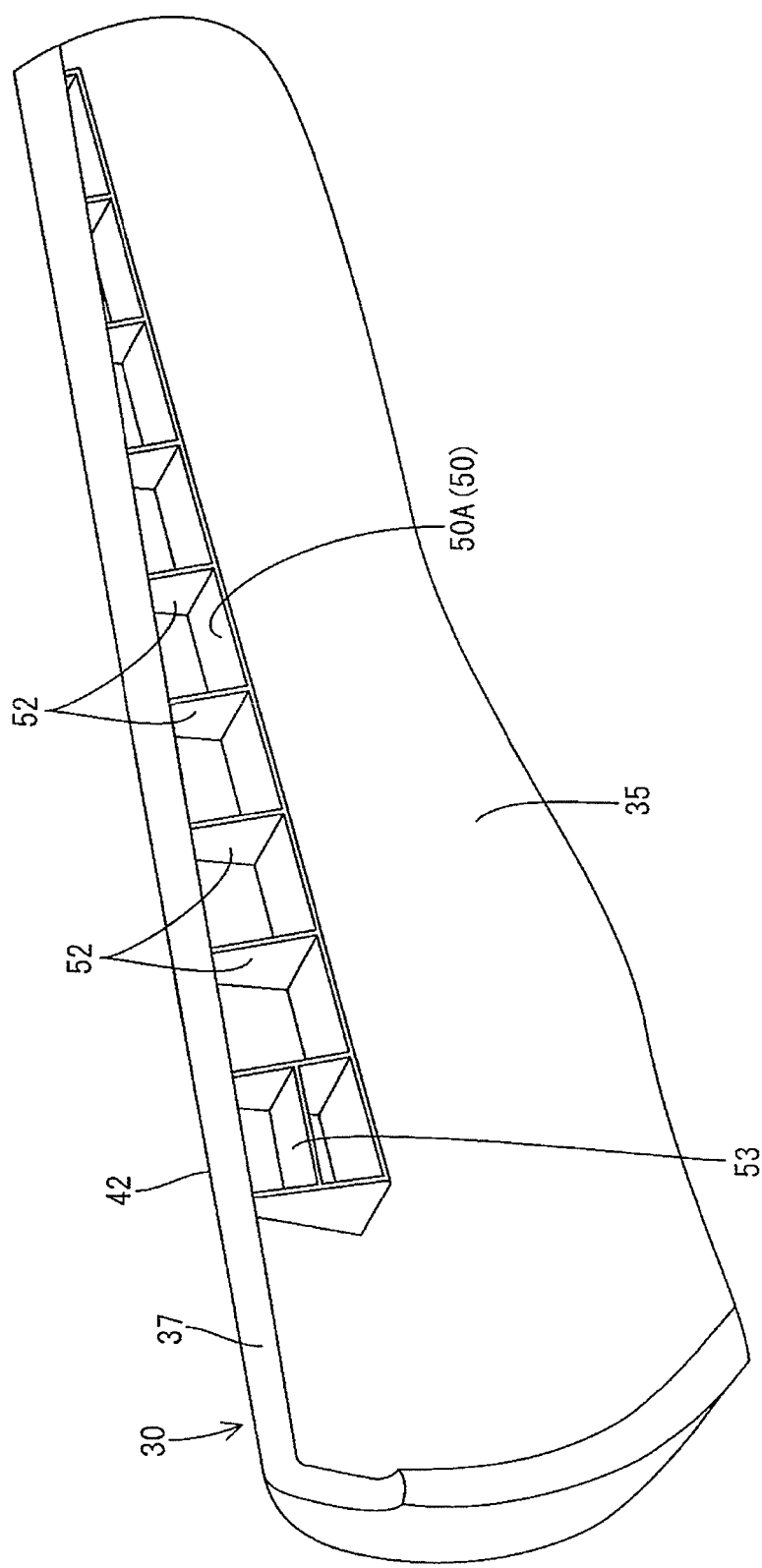
FIG. 4 is a perspective view of the upper board that is not covered with a skin.

As illustrated in FIG. 4, protrudes from a back surface of the upper board 30, which is a surface facing toward the exterior side of the vehicle, toward the exterior of the vehicle. The projecting rib 50 is an example of a protruding member. As illustrated in FIG. 1 and FIG. 4, the projecting rib 50 has a plate-like shape and extends straight in the front-to-rear direction of the vehicle (in the longitudinal direction of the top wall 37).

As described above, in this embodiment, the window glass 13 tilts toward the interior of the vehicle (the left side in FIG. 5) such that the upper edge of the window glass 13 is located more interior than the lower edge thereof. The shade 61 is configured to extend along the window glass 13, that is, to tilt at the same angle as the window glass 13.

The shade 61 that is fully unrolled slopes toward the interior of the vehicle such that the upper edge of the shade 61 is located more interior than a lower edge thereof. The opening 40 is located substantially directly above the shaft 65. In this configuration, the shade 61 that is unrolled is bent at a position close to the opening 40.

Figure 6:
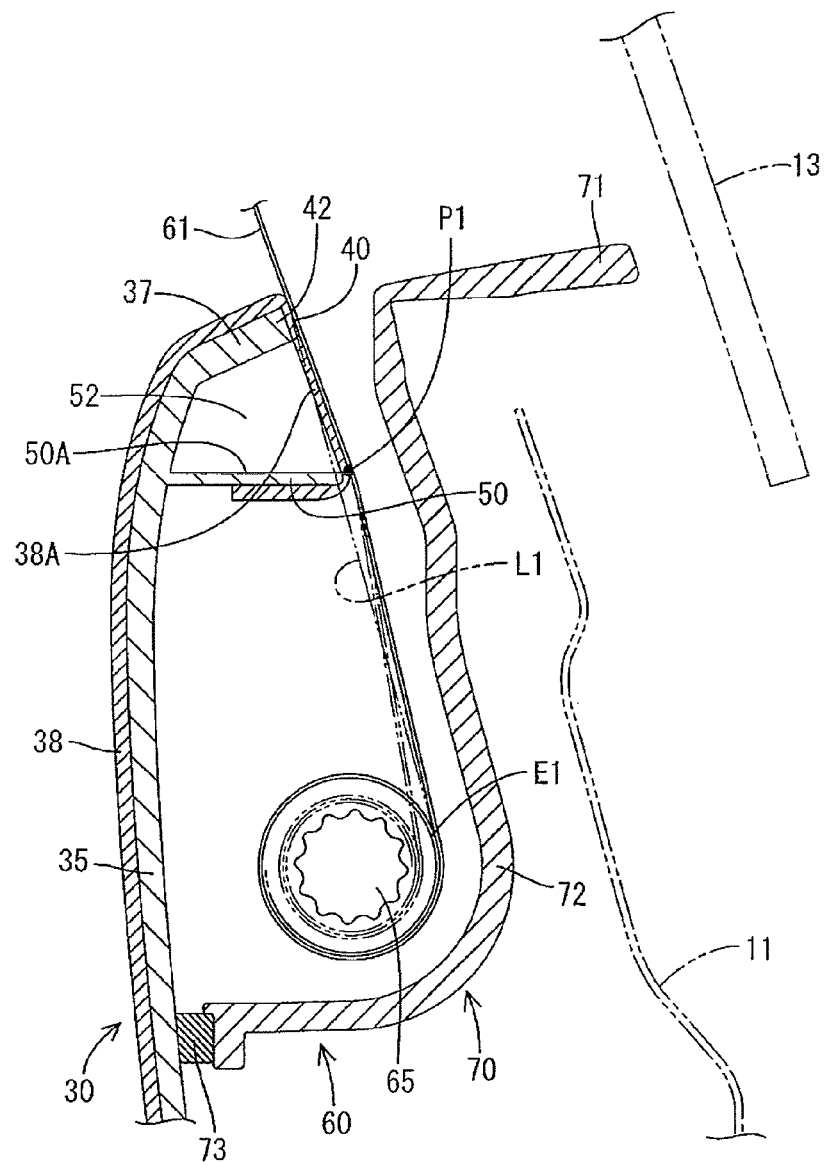
FIG. 6 is a cross-sectional view of a part of the vehicle including the shade assembly and the door trim along a line B-B in FIG. 1.

More specifically described, as illustrated in FIG. 6, the protruded edge of the projecting rib 50 is positioned below the raised section 42 of the interior opening edge and more exterior than the raised section 42. Accordingly, the shade 61 that is drawn upward through the opening 40 comes in contact with a skin 38, which will be described later, from the exterior side of the vehicle.

In this configuration, the shade 61 that is unrolled is bent by the protruded edge of the projecting rib 50 toward the interior of the vehicle in an area corresponding to the raised section 42. The protruded edge of the projecting rib 50 may be referred to as a bend point P1 at which the shade 61 is bent.

As illustrated in the cross sectional view in FIG. 6, the bend point P1 is located more exterior than a straight line L1 that connects an origin E1 of the unrolled portion of the shade 61 and the interior edge of the raised section 42. The origin E1 is a point at which the base end of the unrolled shade 61 is located.

As illustrated in FIG. 5, in an area corresponding to the straight section 41, the shade 61 that is unrolled is leans on the straight section 41 and is bent toward the interior of the vehicle.

The projecting rib 50 extends straight along the longitudinal direction of the top wall 37 (the front-to-rear direction of the vehicle), and thus the bend point P1 that is the protruded edge of the projecting rib 50 extends straight in the front-to-rear direction of the vehicle.

The projecting rib 50 is arranged along an extension line of the straight section 41, and thus the bend point P1 extends straight along the extension line of the straight section 41 over an area substantially corresponding to the raised part 42. In FIG. 7, the straight section 41 and the bend point P1 extend substantially on the same straight line. The shade 61 that is bent at the straight section 41 and the bend point P1 has a bend line that extends straight from the straight section 41 to the raised section 42.

The upper board 30 and the cover 70 that are viewed from above is illustrated in FIG. 7. As illustrated in FIG. 7, the straight section 41 and the bend point P1 extend in a straight line in the front-to-rear direction of the vehicle.

As illustrated in FIG. 7, the opening 40 has a constant width over its length. The opening 40 is slightly curved toward the interior of the vehicle while extending from the front side to the rear side of the vehicle. In FIG. 7, an arrow D1 indicates a direction in which the opening 40 curves. In other words, the opening 40 curves toward the interior of the vehicle while extending from the straight section 41 to the raised section 42.

In this configuration, the opening 40 has a constant width, which is a dimension measured in the width direction of the vehicle, and is slightly curved toward the interior of the vehicle while extending from the front side to the rear side of the vehicle. Accordingly, the raised section 42 is located more interior than the straight section 41, and thus the bend point P1 is located more exterior than the raised section 42.

As described above, the bend point P1 extends straight in the front-to-rear direction of the vehicle. A distance S1 between the raised section 42 and the bend point P1 gradually increases toward the rear side of the vehicle.

As illustrated in FIG. 4 and FIG. 6, connection ribs 52 are arranged on the back surface of the upper board 30 such that the back surface of the upper board 30 and an upper surface 50A of the projecting rib 50 are connected by the connection ribs 52. The connection rib 52 is a vertical rib that extends in the vertical direction and is arranged substantially perpendicular to the projecting rib 50, which is a lateral rib.

The connection rib 52 extends on the back surface of the main wall 35 of the upper board 30 between the upper surface 50A of the projecting rib 50 and the lower surface of the top wall 37. As illustrated in FIG. 4, the connection ribs 52 are arranged in a longitudinal direction of the projecting rib 50 at predetermined intervals.

A reinforcing rib 53 is arranged between adjacent connection ribs 52 to connect the adjacent connection ribs 52. The reinforcing rib 53 increases the rigidity of the connection ribs 52.

Figure 3:
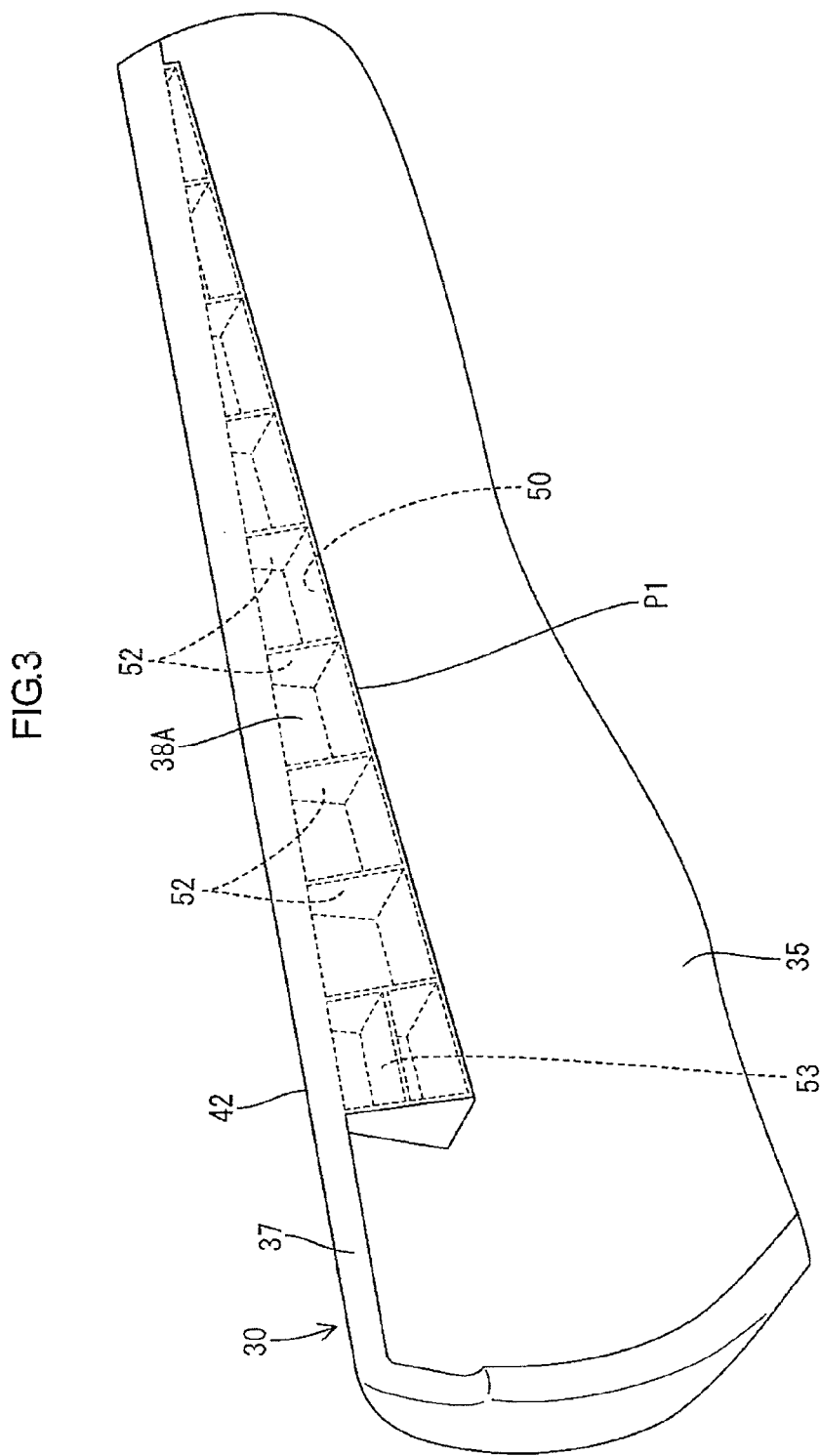
FIG. 3 is a perspective view of a part of an exterior side of the upper board in FIG. 2 that is positioned at a rear side in a front-to-rear direction of the vehicle.

In this embodiment, as illustrated in FIG. 6, the vehicle interior component includes a skin 38 that extends over and covers a surface of the upper board 30. The skin 38 further extends to a backside of the upper board 30 through the opening 40. The part of the skin 38 that extends on the backside of the upper board 30 is referred to as a folded part 38A. As illustrated in FIG. 3 and FIG. 6, the folded part 38A covers a protruded edge of the projecting rib 50 and a protruded edge of each connection rib 52.

The skin 38 may be, but not limited to, a film or a sheet that is made of leather, woven fabric, non-woven fabric, knitted fabric, thermoplastic resin, or thermoplastic elastomer. The skin 38 preferably has flexibility.

Next, effects exerted by this embodiment will be described. In this embodiment, the protruded edge of the projecting rib 50 as the bend point P1 extends straight in the front-to-rear direction of the vehicle. In this configuration, a folding line of the shade 61 that is bent at the bend point P1 is straight.

In such a configuration of this embodiment, since the bend point P1 that is positioned below the raised portion 42 (in the area corresponding to the raised section 42) extends straight, the shade 61 can be bent straight without being bent by the raised section 42 at the interior opening edge of the opening 40. With this configuration, the shade 61 is less likely to have wrinkles or folds.

In this configuration, the protruding member 50 has the bend point P1, which is the protruded edge, that extends along the extension line of the straight section 41. Thus, the shade 61 that is unrolled from the shaft 65 is bent linearly along the straight section 41 and the bend point P1 over the straight section 41 and the bend point P1. Accordingly, even if the interior opening edge of the opening 40 has the raised section

42, the shade 61 is not bent at the raised section 42, but at the straight section 41 over the area including the straight section 41 and the raised section 42 (in this embodiment). As a result, the shade 61 is bent linearly along the protruded edge. The shade 61 is less likely to have wrinkles or folds.

The bend point P1 is located more exterior of the vehicle than the raised section 42 of the opening 40.

With this configuration, the shade 61 can lean on the bend point P1 before the raised section 42 when the shade 61 is bent toward the interior of the vehicle. The shade 61 can be properly bent along the protruded edge of the protruding member 50.

The opening 40 curves toward an interior of the vehicle while extending from the straight section 41 to the raised section 42.

With this configuration, the raised section 42, which is the edge of the opening 40, can be easily positioned more interior of the vehicle than the bend point P1. The width of the opening 40 may be enlarged at a part including the raised section 42 such that the raised section 42 is positioned at the interior side of the vehicle. In such a case, the opening 40 may have a larger width at the part including the raised section 42 than a part including the straight section 41. As a result, the opening 40 may have an irregular width and the appearance thereof may be degraded. According to the present technology, the opening 40 curves toward the interior of the vehicle such that the raised section 42 is positioned more interior of the vehicle than the bend point P1. With this configuration, the opening 40 is less likely to have the irregular width and the appearance thereof is less likely to be degraded.

The protruding member includes a projecting rib 50 that has a plate-like shape and projects from the main wall 35 of the upper board 30 toward the exterior of the vehicle. The projecting rib 50 has the protruded edge as the bend point P1 extending in the longitudinal direction of the top wall 30.

With this configuration, the bend point P1 can be easily obtained by simply providing the projecting rib 50.

The bend point P1 of the protruding rib 50 extends straight along an extension line of the straight section 41 of the interior opening edge.

The vehicle interior component further includes a connection rib 50. The connection rib 52 is arranged to connect the upper board 30 and the upper surface 50A of the projecting rib 50.

With this configuration, the protruding rib 50 can have higher rigidity.

The vehicle interior component further includes a skin 38 that covers a surface of the upper board 30 and the protruded edge of the projecting rib 50.

With this configuration, the shade 61 comes in contact with apart of the skin 38, which has a relatively high flexibility, and thus the shade 61 is less likely to be worn away.

OTHER EMBODIMENTS

Aspects of the present invention are not limited to the embodiments described above with reference to the drawings. For example, the aspects of the present invention may include following embodiments.

(1) The vehicle interior component may be a back door trim or a hatchback door trim. In addition, the technology of the present invention may be applied to any vehicle interior component that is provided with the shade assembly.

(2) The interior component body may only include the trim board 21. Further, the top wall of the interior component body may only include the top wall of the upper board 30.

(3) The opening (an opening for the shade) may be a through hole that extends through the top wall 37 of the upper board 30 in the vertical direction.

(4) The raised section 42 may be positioned at a middle section of the upper board 30 in the front-to-rear direction of the vehicle.

(5) The raised section 42 may extend upwardly from the straight section 41 in a straight or a curved line. The raised section 42 may extend in a mountain-like shape.

(6) In the above embodiment, a boundary between the straight section 41 and the raised section 42 is defined by the division bar 15, but may not be defied by the division bar 15.

(7) The vehicle interior component may include a tubular storage member, which is a separate member from the upper board 30, to hold the shaft 65 therein. Such a tubular storage member may be attached to an exterior surface of the upper board 30, for example. A member of the shade assembly 60 (for example, the tubular storage member) may be attached to both of a member of the door trim (the upper board 30 in this embodiment) and a vehicle panel (the inner panel 11, for example).

(8) The connection rib 52 may connect the lower surface of the projecting rib 50 and the back surface of the upper board 30.

(9) The vehicle interior component may not include the skin 38. The shade 61 may be in contact with the protruded edge of the projecting rib 50.

(10) The opening 40 may have any configuration or shape that allows the shade 61 to pass therethrough. For example, the opening may be defined by a cutout in the top wall 37 and a component attached to the vehicle panel (for example, a weather strip). The cutout opens toward the exterior of the vehicle and extends along the interior opening edge. In other words, the opening may be defined by the top wall 37 and a component other than the component included in the door trim 20. In addition, the shape of the opening 40 is not limited to the above-described shape that has a closed end, but may have a shape that opens toward the exterior of the vehicle. In other words, the opening 40 may be defined by a cutout alone.

Effects

A technology disclosed herein relates to a vehicle interior component to which a shade assembly is mounted. The shade assembly includes a flexible shade and a shaft configured to roll up the shade. The interior component includes an interior component body including a top wall and a protruding member. The interior component includes the top wall positioned above the shaft, having an elongated shape, arranged such that a longitudinal direction thereof corresponds to an axial direction of the shaft, having an opening through which the shade is drawn upward above the top wall, and having an exterior opening edge and an interior opening edge at the opening. The opening extends through the top wall in a thickness direction thereof and along a longitudinal direction thereof. The interior opening edge includes a straight section extending straight in the longitudinal direction of the top wall and a raised section having a different shape from the straight section. The protruding member is arranged below the raised section and has a protruded edge extending straight in the longitudinal direction of the top wall and on which the shade leans from an exterior side of the vehicle such that the shade bends toward an interior of the vehicle at the protruded edge when the shade is unrolled from the shaft.

In this configuration, the protruding member has the protruded edge that extends straight in the longitudinal direction of the top wall, and thus the shade that is unrolled from the shaft is bent linearly along the protruded edge. Since the vehicle interior component includes the protruding member that has the protruded edge that extending straight, even if the interior opening edge of the opening has the raised section, the shade is not bent at the raised section, but at the protruded edge. As a result, the shade is bent linearly along the protruded edge and the shade is less likely to have wrinkles or folds.

According to a second aspect of the present technology, the protruded edge of the protruding member may be located more exterior of the vehicle than the raised section.

With this configuration, the shade can lean on the protruding member before the raised section when the shade is bent toward the interior of the vehicle. The shade can be properly bent along the protruded edge of the protruding member.

According to a third aspect of the present technology, the opening may be curved toward the interior of the vehicle while extending from the straight section to the raised section.

With this configuration, the raised section of the opening can be easily positioned more interior of the vehicle than the protruded edge of the protruding member. The width of the opening may be enlarged at a part including the raised section to position the raised section more interior of the vehicle than the protruded edge of the protruding member. In such a case, the opening may have a larger width at the part including the raised section than a part including the straight section. As a result, the opening may have an irregular width and the appearance thereof may be degraded. According to the present technology, the opening curves toward the interior of the vehicle such that the raised section is positioned at the vehicle interior side. With this configuration, the opening is less likely to have the irregular width and the appearance thereof is less likely to be degraded.

According to a fourth aspect of the present technology, the protruding member may include a projecting rib having a plate-like shape and projecting from the interior component body toward an exterior of the vehicle. The projecting rib may have the protruded edge extending straight in the longitudinal direction of the top wall.

With this configuration, the protruded edge of the protruding member can be easily obtained by simply providing the projecting rib.

According to a fifth aspect of the present technology, the protruded edge of the protruding member extends straight along an extension line of the straight section of the interior opening edge.

With this configuration, the shade can be bent linearly at the straight section and the protruded edge that extends straight from the straight section.

According to a sixth aspect of the present technology, the vehicle interior component may further include a connection rib. The connection rib may be arranged to connect the interior component body and one of an upper surface and a lower surface of the projecting rib.

With this configuration, the protruding member may have higher rigidity.

According to a seventh aspect of the present technology, the vehicle interior component may further include a skin covering a surface of the interior component body and the protruded edge of the projecting member.

With this configuration, the shade comes in contact with a part of the skin, and thus the shade is less likely to be worn out.

According to an eighth aspect of the present technology, the protruded edge of the protruding member may extend along the longitudinal direction of the top wall over an area substantially corresponding to the raised section.

With this configuration, the shade can be properly bent linearly over the area corresponding to the raised section.

According to a ninth aspect of the present technology, the raised section may extend gradually upward from the straight section.

Even if the opening has such a configuration, the shade is less likely to have wrinkles or folds.

According to a tenth aspect of the present technology, the opening may have a constant width over its entire length.

With this configuration, the appearance of the opening is less likely to be degraded.

According to an eleventh aspect of the present technology, the interior component body may include a door trim. The door trim includes a main wall and the top wall extending at an angle with the main wall.

In this configuration, the interior component can exert its effect properly, because the shade can cover the window that is attached to the interior component without wrinkles or folds.

According to a twelfth aspect of the present technology, the interior component body may further include a shade cover. The door trim and the shade cover may define a storage space in which the shade assembly is placed. The top wall may include a first top wall and a second top wall. The door trim includes the first top wall and the shade cover includes the second top wall. The first top wall and the second top wall may be spaced apart from each other with a predetermined distance therebetween, thereby providing the opening in the interior component body.

With this configuration, the opening can be easily obtained by simply using the top walls of the door trim and the shade cover.

According to a thirteenth aspect of the present technology, a vehicle interior assembly may be provided. The vehicle interior assembly includes an interior component body including a top wall having an elongated shape, a shade assembly including a flexible shade and a shaft being configured to roll up the flexible shade, and a protruding member having a protruded edge. The shaft is located below the top wall such that an axis of the shaft extends along a longitudinal direction of the top wall. The top wall has an opening through which the shade is drawn upward above the top wall. The opening extends through the top wall in a thickness direction thereof and along the longitudinal direction thereof. The top wall has an exterior opening edge and an interior opening edge at the opening. The interior opening edge includes a straight section extending straight in the longitudinal direction of the top wall and a raised section having a different shape from the straight section. The protruding member is arranged below the raised section. The protruded edge of the protruding member extends straight in the longitudinal direction of the top wall and on which the shade leans from an exterior side of the vehicle such that the shade bends toward an interior of the vehicle at the protruded edge when the shade is unrolled from the shaft.

In this configuration, the protruding member has the protruded edge that extends straight in the longitudinal direction of the top wall, and thus the shade that is unrolled from the shaft is bent linearly along the protruded edge. Since the vehicle interior component includes the protruding member that has the protruded edge extending straight, even if the interior opening edge of the opening has the raised section, the shade is not bent at the raised section, but at the protruded edge. As a result, the shade is bent linearly along the protruded edge and the shade is less likely to have wrinkles or folds.

The present technology can provide a vehicle interior component in which the shade is less likely to have wrinkles or folds even if the vehicle interior component has an opening, which allows the shade to pass therethrough, that has a non-linear edge.

The invention claimed is:

1. A vehicle interior component to which a shade assembly is mounted, the shade assembly including a flexible shade and a shaft configured to roll up the flexible shade, the interior component comprising:
an interior component body configured to be mounted on an interior side of a vehicle body panel, the interior component body including a top wall having an elongated shape and arranged above the shaft such that a longitudinal direction of the top wall corresponds to an axial direction of the shaft, the top wall having:
an opening for drawing the flexible shade out of the interior component body above the top wall, the opening extending along the longitudinal direction of the top wall; and
an exterior opening edge and an interior opening edge that define the opening, the interior opening edge on an interior side of the vehicle including a straight section that extends straight in the longitudinal direction of the top wall and a raised section that is curved upwardly; and
a protruding member
having a protruded edge that extends straight in the longitudinal direction of the top wall and arranged below the raised section such that the flexible shade leans from an exterior side of the vehicle and bends toward an interior of the vehicle at the protruded edge when the flexible shade is unrolled from the shaft.

2. The vehicle interior component according to claim 1, wherein the protruded edge of the protruding member is located more exterior of the vehicle than the raised section.

3. The vehicle interior component according to claim 2, wherein the opening curves toward the interior of the vehicle while extending from the straight section to the raised section.

4. The vehicle interior component according to claim 1, wherein the protruding member includes a projecting rib having a plate-like shape and projecting from the interior component body toward an exterior of the vehicle and the projecting rib has the protruded edge extending straight in the longitudinal direction of the top wall.

5. The vehicle interior component according to claim 1, wherein the protruded edge of the protruding member extends straight along an extension line of the straight section of the interior opening edge.

6. The vehicle interior component according to claim 4, further comprising a connection rib, the connection rib being arranged to connect the interior component body and one of an upper surface and a lower surface of the projecting rib.

7. The vehicle interior component according to claim 1, further comprising a skin covering a surface of the interior component body and the protruded edge of the projecting member.

8. The vehicle interior component according to claim 1, wherein the protruded edge of the protruding member extends along the longitudinal direction of the top wall over an area substantially corresponding to the raised part.

9. The vehicle interior component according to claim 1, wherein the raised section extends gradually upward from the straight section.

10. The vehicle interior component according to claim 3, wherein the opening has a constant width over its entire length.

11. The vehicle interior component according to claim 1, wherein the interior component body includes a door trim, the door trim includes a main wall and the top wall extending at an angle with the main wall.

12. The vehicle interior component according to claim 1, wherein
the interior component body further includes a shade cover, the door trim and the shade cover defining a storage space in which the shade assembly is placed,
the top wall includes a first top wall and a second top wall, the door trim including the first top wall and the shade cover including the second top wall, and
the first top wall and the second top wall are spaced apart from each other with a predetermined distance therebetween, thereby providing the opening in the interior component body.

13. A vehicle interior assembly comprising:
an interior component body configured to be mounted on an interior side of a vehicle body panel, the interior component body including a top wall having an elongated shape;
a shade assembly including:
a flexible shade; and
a shaft configured to roll up the flexible shade, the shaft being located below the top wall such that an axis of the shaft extends along a longitudinal direction of the top wall; and
a protruding member having a protruded edge, wherein
the top wall has an opening through which for drawing the flexible shade out of the interior component body above the top wall, the opening extending along the longitudinal direction of the top wall,
the top wall has an exterior opening edge and an interior opening edge that define the opening, the interior opening edge on an interior side of the vehicle including a straight section that extends straight in the longitudinal direction of the top wall and a raised section that is curved upwardly, and
the protruding edge of the protruding member extends straight in the longitudinal direction of the top wall and arranged below the raised section such that the flexible shade leans from an exterior side of the vehicle and bends toward an interior of the vehicle at the protruded edge when the flexible shade is unrolled from the shaft.

* * * * *